(12) United States Patent
Lee et al.

(10) Patent No.: US 10,702,089 B2
(45) Date of Patent: Jul. 7, 2020

(54) EGG COOKING SYSTEM

(71) Applicant: LUNGHWA UNIVERSITY OF SCIENCE AND TECHNOLOGY, Taoyuan (TW)

(72) Inventors: Lian-Wang Lee, Taoyuan (TW); Hsiu-Chao Lee, Taoyuan (TW); Bo-Xu Su, Taoyuan (TW); Ming-Xian Cai, Taoyuan (TW); Te-Sheng Wei, Taoyuan (TW); Tsung-Hsin Lee, Taoyuan (TW)

(73) Assignee: Lunghwa University of Science and Technology, Taoyuan (TW)

( * ) Notice: Subject to any disclaimer, the term of this patent is extended or adjusted under 35 U.S.C. 154(b) by 215 days.

(21) Appl. No.: 16/021,298

(22) Filed: Jun. 28, 2018

(65) Prior Publication Data

US 2019/0159624 A1    May 30, 2019

(30) Foreign Application Priority Data

Nov. 27, 2017   (TW) .............................. 106141118 A

(51) Int. Cl.
*A47J 43/14* (2006.01)
*A47J 29/02* (2006.01)

(52) U.S. Cl.
CPC .............. *A47J 29/02* (2013.01); *A47J 43/145* (2013.01)

(58) Field of Classification Search
CPC ........... A47J 43/14; A47J 43/145; A47J 29/02
USPC .................. 99/498, 499, 500, 424, 571, 574
See application file for complete search history.

(56) References Cited

U.S. PATENT DOCUMENTS

| | | | | |
|---|---|---|---|---|
| 1,361,121 A | * | 12/1920 | Weiss ..................... | A47J 43/145 99/491 |
| 1,988,030 A | * | 1/1935 | Young ................... | A47J 43/145 99/498 |
| 2,356,707 A | * | 8/1944 | Sigler ................... | A47J 43/145 269/238 |
| 2,670,674 A | * | 3/1954 | Whitsel ................... | A47J 37/00 99/334 |
| 3,958,505 A | * | 5/1976 | Baker ................... | A47J 43/145 99/495 |
| 5,054,384 A | * | 10/1991 | Smith, Jr. ............. | A47J 37/044 99/335 |

FOREIGN PATENT DOCUMENTS

| WO | WO-2008039517 A2 * | 4/2008 | ............. A47J 29/02 |
|---|---|---|---|
| WO | WO-2019060973 A1 * | 4/2019 | ............. A47J 43/14 |

* cited by examiner

*Primary Examiner* — Reginald Alexander
(74) *Attorney, Agent, or Firm* — Rosenberg, Klein & Lee

(57) ABSTRACT

An egg cooking system includes two woks and each of the woks receives oil from an oil supply member. A support member is driven by a driving unit to allow one egg to be put in the at least one standby portion and the egg is pressed by the pressing member. A cracking member cracks the egg and the pressing unit moves toward the direction that the egg is located so that a claw is opened, and the egg flows into one of the woks. The egg is cooked for a pre-set time, and is dropped into the other wok to be cooked. The cooked egg is then dropped to a plate. The pressing unit presses the egg shell of the egg to further open the claw, and the egg shell drops into a garbage can.

10 Claims, 13 Drawing Sheets

EGG COOKING SYSTEM

BACKGROUND OF THE INVENTION

1. Fields of the Invention

The present invention relates to an egg cooking system, and more particularly, to an egg cooking system that automatically cook the eggs by pre-set processes.

2. Descriptions of Related Art

People in the modern world most are busy and do not have sufficient time to cook. Most people eat at least one egg in the morning, and actually most people buy cooked eggs from food stands or stores because lack of time. Too much oil is added when cooking the eggs for most of the stores, and health concern then raised for the consumers.

The present invention is intended to provide an egg cooking system that automatically cook the eggs by pre-set processes so as to eliminate the drawbacks mentioned above.

SUMMARY OF THE INVENTION

The present invention relates to an egg cooking system and comprises a feeding device having a support member and a feeding rail, wherein the support member has at least one standby portion, and the feeding rail has at least one egg put therein which is positioned at a pressing position by the at least one at least one of the support member. A pressing device includes a pressing member which has a contact member, and the contact member contacts the at least one egg. The pressing device is pivotably connected to a claw. The pressing position is located corresponding to the claw and the at least one egg located in the r is positioned at the pressing position. The claw has a drop rail and a guide portion, wherein the drop rail has a movable member and the guide portion has a positioning member. When the pressing member presses the claw, the movable member is movable along the drop rail, and the positioning member is movable along the guide portion to open the claw. A cracking device is located beside the claw and has a cracking member pivotably connected thereto. The cracking member cracks the at least one egg located at the pressing position. A cooking device has at least one wok pivotably connected thereto. The least one wok has a heating member. An oil supply unit is located corresponding to the at least one wok and provides oil into the at least one wok. A garbage can is located at one end of the cooking device. An operation unit has at least one pre-set angle and a pre-set time. The operation unit is coupled to a driving unit, a control unit and a temperature control unit. The control unit is coupled to the feeding device, the cracking device and the cooking device. The driving unit is coupled to the pressing device. The temperature control unit is coupled to the heating member.

Preferably, the feeding rail has a path which includes an adjustment member which is movable along the path. The feeding rail includes a notch that is located corresponding to the support member. A positioning portion is engaged with the notch.

Preferably, the oil supply unit includes an oil supply member and a squeezer which is located corresponding to the oil supply member. The squeezer is coupled to the control unit.

Preferably, the garbage can includes a board which is located corresponding to the at least one wok. The garbage can includes an opening.

Preferably, the operation unit is coupled to a display unit which displays a number of the at least one egg.

Preferably, the drop rail is located vertically, and the diameter of the guide portion is a curved slot which curves outward from the top to the bottom thereof.

Preferably, the heating member is coupled to a fuse which is connected to a handle of the at least one wok.

Preferably, the contact member is made of rubber.

Preferably, the diameter of the at least one standby portion is larger than that of the at least one egg.

Preferably, the contact member is located corresponding to the pressing position.

The advantages of the present invention are that the users can input the number of eggs into the display unit and the operation unit then commands the control unit and the temperature control unit to operate the control unit to drive the woks to respectively pivot a pre-set angle. The control unit drives the pressing member to press on the squeezer so as to operate the oil supply unit to spread oil to the woks. The woks are heated by the heating members, and the woks are respectively pivoted to the initial positions by the control unit.

The support member is able to prevent multiple eggs in the rail from being pressed simultaneously.

The contact member is able to contact the eggs of different sizes and shapes. The present invention uses the movable member to move downward along the drop rail so that the contact member is able to contact the eggs of different sizes and shapes. In addition, the guide portion is curved outward and the operation unit measures the axial length of the eggs. When the axial length of the egg is longer than the pre-set value of the operation unit, the operation unit commands the driving unit to reversely drive the contact member to gently contact the egg.

The torque that the control unit generates is about 12 kgf-cm, and the cracking member cracks the egg and returns respectively spends only one second. Therefore, the cracking member is avoided from being attached with too much of the egg liquid of the eggs.

The driving unit drives the driving member to command the pressing member to press toward the direction that the egg is located so that the claw is opened by the movement of the movable member along the drop rail, and by the positioning member moving along the guide portion. This action simulates a user's two hands separating an egg shell, such that the egg liquid flows to one of the woks. After a pre-set time, the egg liquid completely flows into the wok. When the bottom of the egg is cooked and the top of the egg is cooked medium rare, the control unit pivots the wok to allow the egg liquid to drop into the other wok which then cooks the top of the egg. After a pre-set time, the control unit pivots the latter wok to drop the cooked egg to a plate located beneath the wok to complete the cooking of the egg that is cooked in the way of easy over.

The fuse is coupled to the handle of the wok so as to prevent the egg from overly heated.

The control unit pivots the wok to another pre-set angle, and the driving unit drives the driving member to move the pressing member continuously and downward to press the egg shell, so that the egg shell is pushed downward to open the claw. The movable member moves downward along the drop rail, and the positioning member is moved along the guide portion to further open the claw. The egg shell then drops on the bottom of the wok and then drops into the garbage can via the board.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
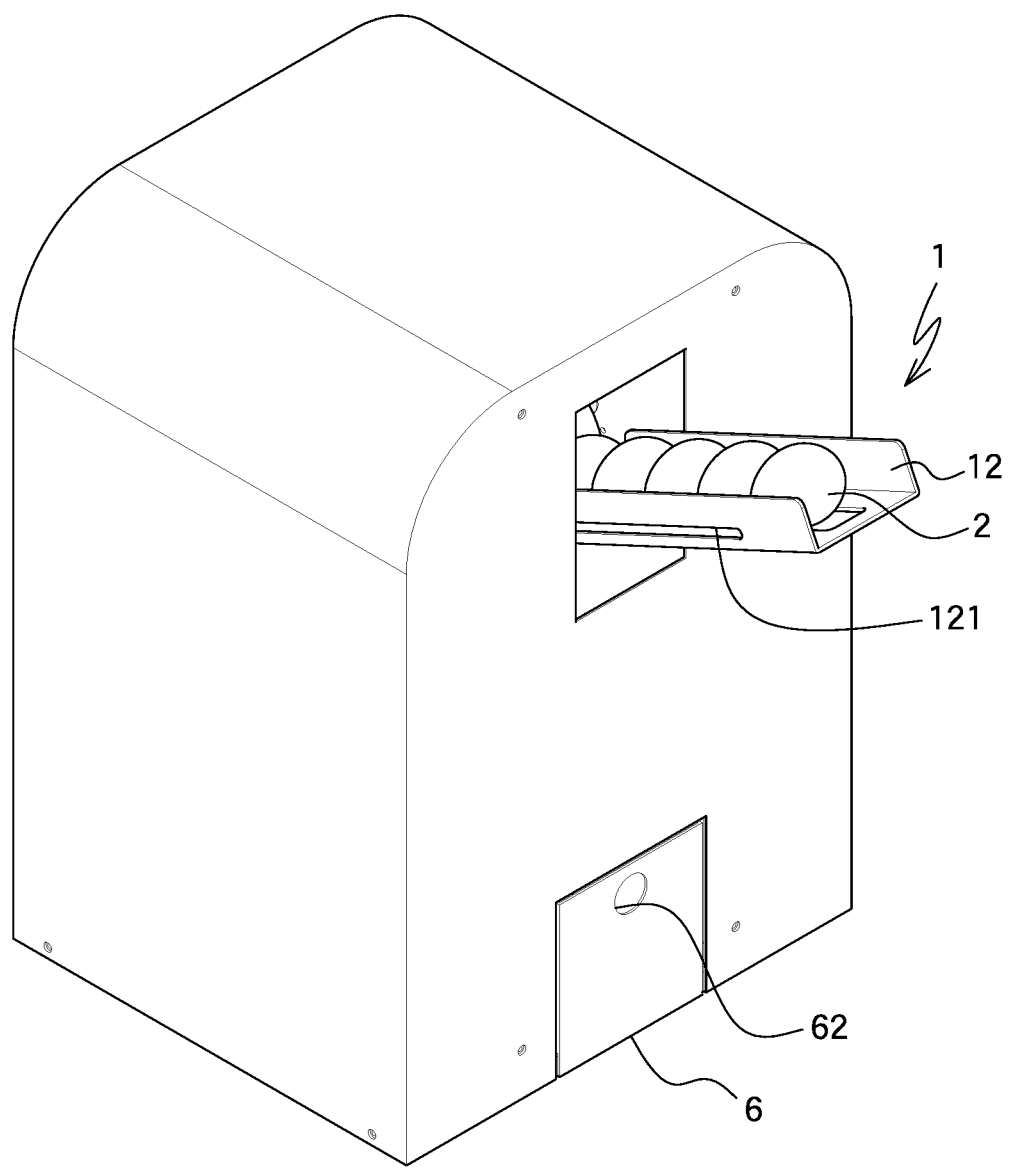
FIG. 1 is a perspective view to show the egg cooking system of the present invention.
Figure 2:
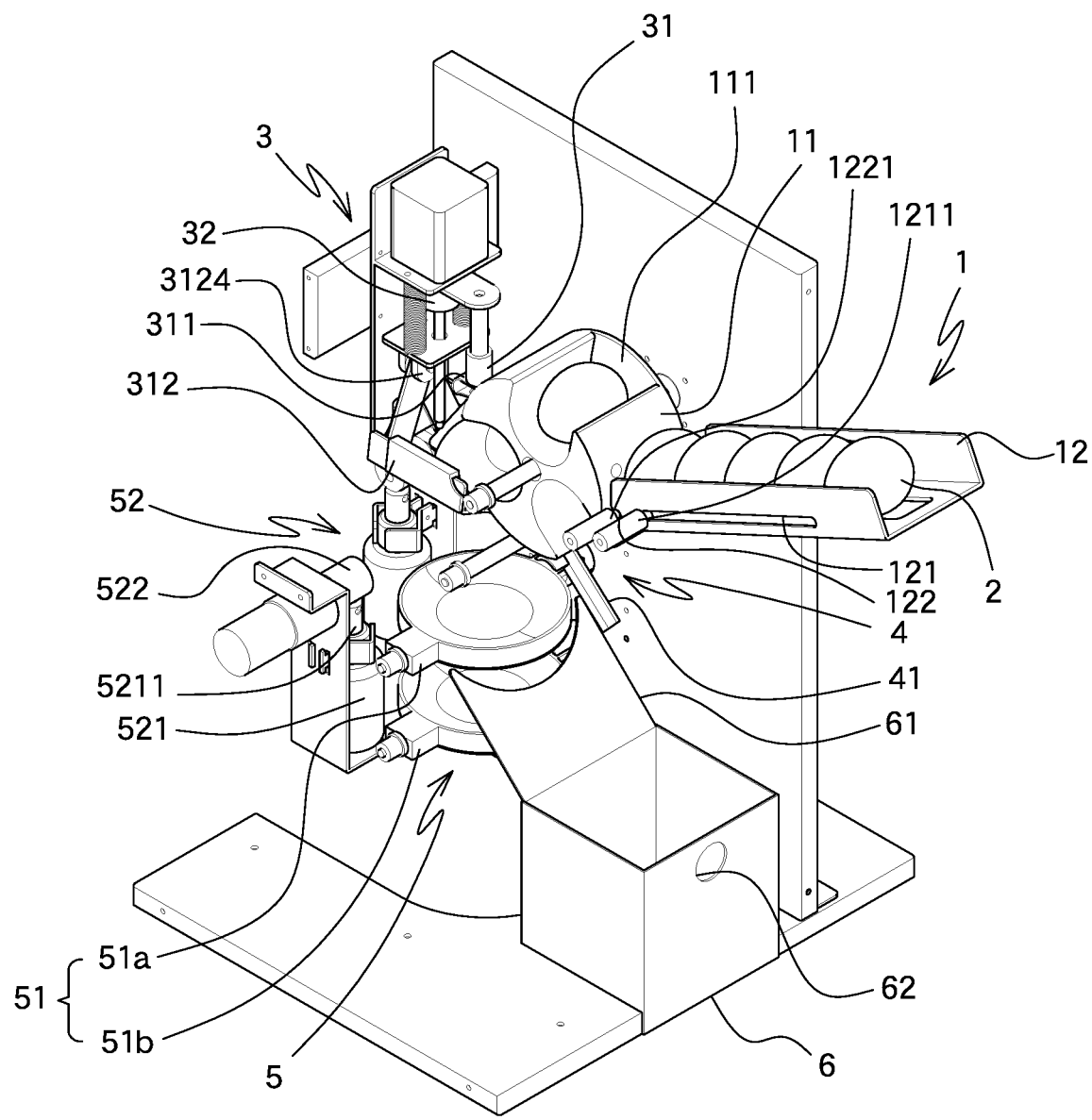
FIG. 2 is a perspective view to show the egg cooking system of the present invention without the casing.
Figure 3:
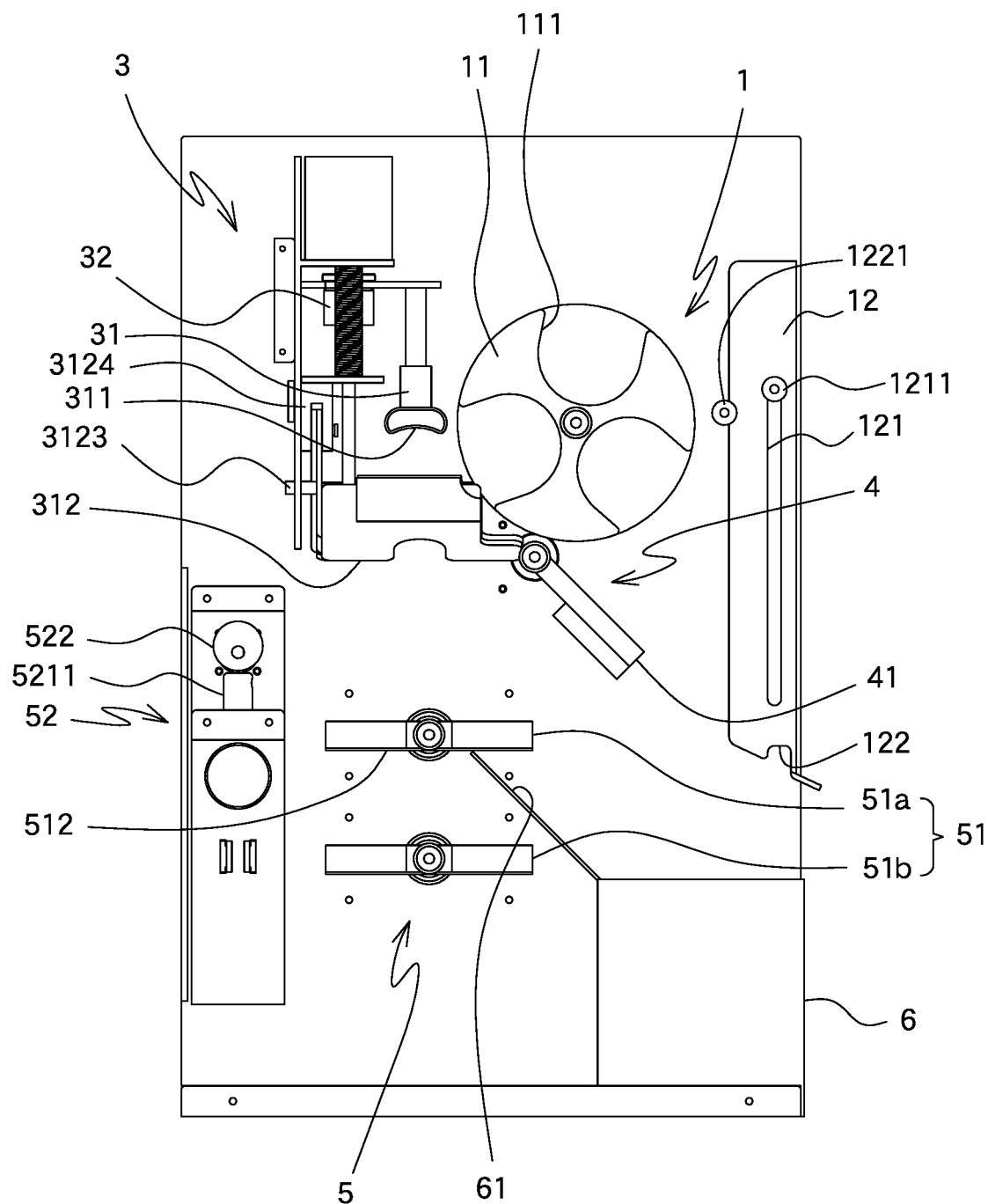
FIG. 3 shows that the feeding rail is in retracted status.

Referring to FIGS. 1 to 4, the egg cooking system of the present invention comprises a feeding device 1 having a support member 11 and a feeding rail 12. The support member 11 has at least one standby portion 111, and the feeding rail 12 has at least one egg 2 put therein which is positioned at a pressing position P1 by the at least one standby portion 111 of the support member 11. In one embodiment, the length of the at least one standby portion 111 is longer the axial length of the egg 2. The feeding rail 12 has a path 121 which includes an adjustment member 1211 which is movable along the path 121. The feeding rail 12 includes a notch 122 that is located corresponding to the support member 11. A positioning portion 1221 is engaged with the notch 122. When egg cooking system is not in use or the feeding rail 12 is to be retracted, the feeding rail 12 is lifted to separate the notch 122 from the positioning portion 1221. The positioning portion 1221 is movable in the path 121 to retract the feeding rail 12 into the casing of the egg cooking system.

A pressing device 3 has a pressing member 31 which has a driving member 32. In one embodiment, the driving member 32 is a ball lead screw which is connected to the pressing member 31. The pressing member 31 has a contact member 311, and the contact member 311 contacts the at least one egg 2. Preferably, the contact member 311 is made of rubber and is in a form of a curved pad. The pressing device 3 is pivotably connected to a claw 312, and the pressing position P1 is located corresponding to the claw 312. The at least one egg 2 located in the at least one standby portion 111 is positioned at the pressing position P1. The contact member 311 is located corresponding to the pressing position P1. The claw 312 has a drop rail 3121 and a guide portion 3122. In the embodiment, the drop rail 3121 is located vertically and the diameter of the guide portion 3122 is a curved slot which curves outward from the top to the bottom thereof. The drop rail 3121 has a movable member 3124 and the guide portion 3122 has a positioning member 3123. When the pressing member 31 presses the claw 312, the movable member 3124 is movable along the drop rail 3121, and the positioning member 3123 is movable along the guide portion 3122 to open the claw 312.

A cracking device 4 is located beside the claw 312 and has a cracking member 41 pivotably connected thereto. The cracking member 41 is pivoted and cracks the at least one egg 2 located at the pressing position P1.

A cooking device 5 has at least one wok 51 pivotably connected thereto. The least one wok 51 has a heating member 511. An oil supply unit 52 is located corresponding to the at least one wok 51 and provides oil into the at least one wok 51. In one embodiment, the oil supply unit 52 includes an oil supply member 521 and a squeezer 522 which is located corresponding to a presser 5211 of the oil supply member 521. In the embodiment, the squeezer 5211 is a cam, and the at least one wok 51 includes water-based Teflon.

A garbage can 6 is located at one end of the cooking device 5, and includes a board 61 which is located corresponding to the at least one wok 51. The board 61 is shaped corresponding to the at least one wok 51 so that when the at least one wok 51 is pivoted, the at least one wok 51 does not hit the board 61. The garbage can 6 includes an opening 62 so that the users can carry the garbage can 6 via the opening 62.

An operation unit 7 includes at least one pre-set angle and a pre-set time. The operation unit 7 is coupled to a driving unit 71, a control unit 72 and a temperature control unit 73. The control unit 72 is coupled to the feeding device 1, the cracking device 4, the cooking device 5 and the squeezer 522. The driving unit 71 is coupled to the pressing device 3, and the temperature control unit 73 is coupled to the heating member 511. The heating member 511 is coupled to a fuse 5111 which is connected to a handle 513 of the at least one wok 51. The operation unit 7 is coupled to a display unit 73 which displays the number of eggs.

Figure 4:
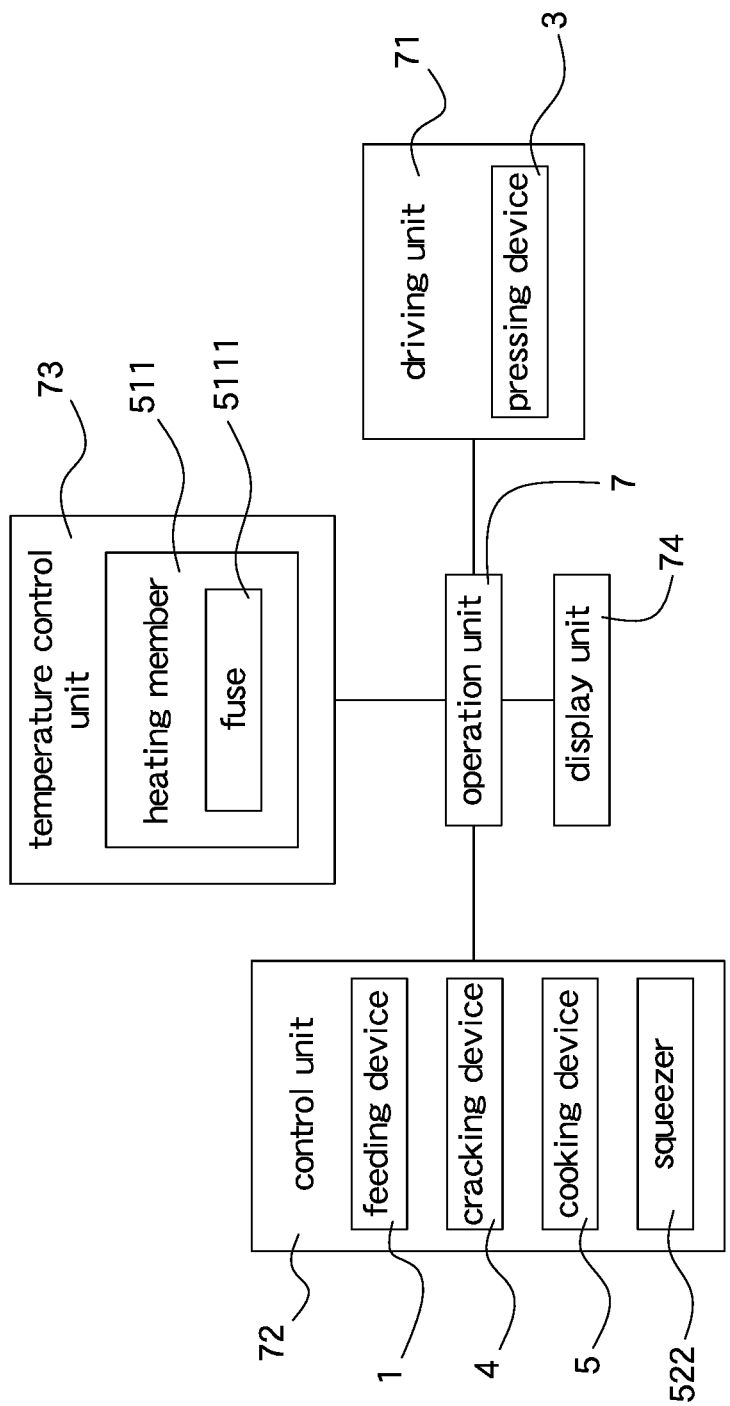
FIG. 4 illustrates the block diagram of the egg cooking system of the present invention.
Figure 5:
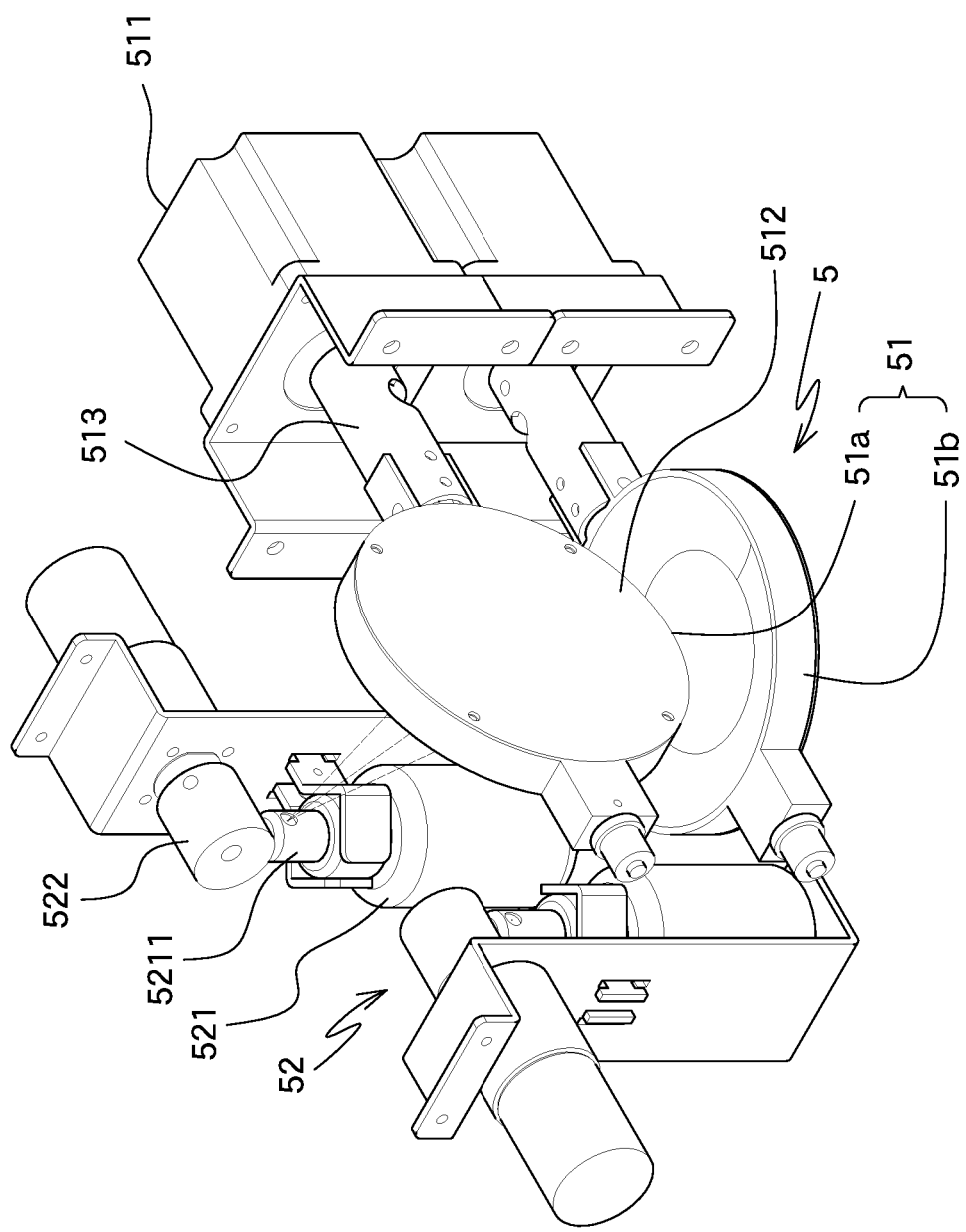
FIG. 5 shows oil is supplied from the oil supply member to the wok.

When the number of eggs is input by the operation unit 7 and displayed on the display unit 73, the feeding rail 12 is pulled outward and the adjustment member 1211 is movable in the path 121. The positioning portion 1221 is engaged with the notch 122 so that the feeding rail 12 is orientated upward. The eggs 2 are put into the feeding rail 12 as shown in FIGS. 4 and 5. The operation unit 7 commands the control unit 72 and the temperature control unit 73 to drive the wok 51 to be pivoted from the initial position to the first pre-set angle. The control unit 72 then drives the presser 5211 to press the squeezer 522. The oil supply member 52 spreads oil into the wok 51 and the heating member 511 heats the wok 51, and the control unit 72 commands the wok 51 to pivot back to the initial position.

Figure 6:
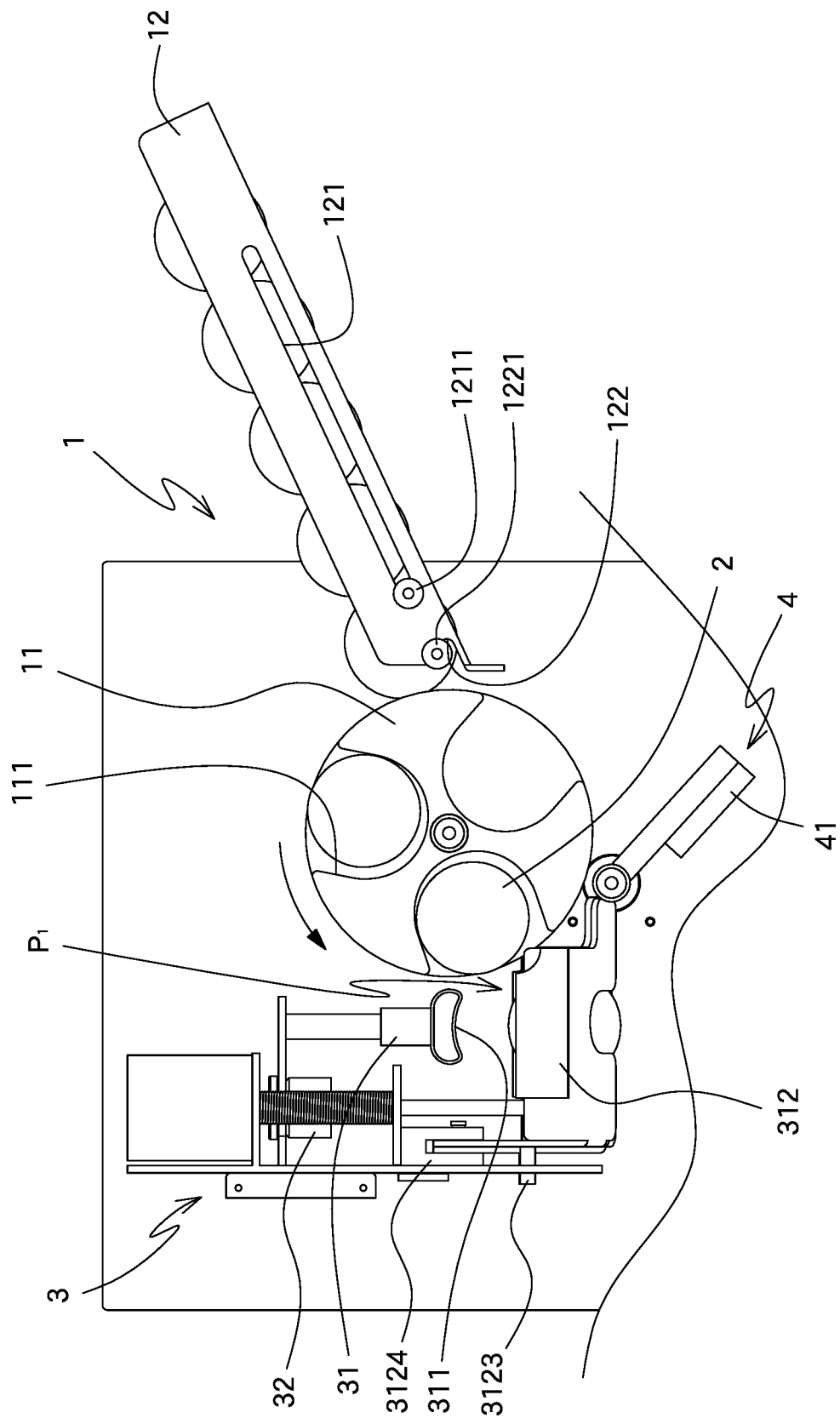
FIG. 6 shows that the eggs are located in the feeding device and the one of the eggs is located at the pressing position.

As shown in FIG. 6, the control unit 72 drives the support member 11 to be operational status by using a ball lead screw to enlarge the standby portion 111, and the eggs move to the standby portion 111 due to gravity. The control unit 72 drives the support member 11 to rotate ⅓ revolution, and one of the eggs 2 moves to the pressing position P1. The support member 11 prevents multiple eggs 2 from entering into the path 12, and prevents the contact member 311 presses multiple eggs 2 simultaneously.

Figure 7:
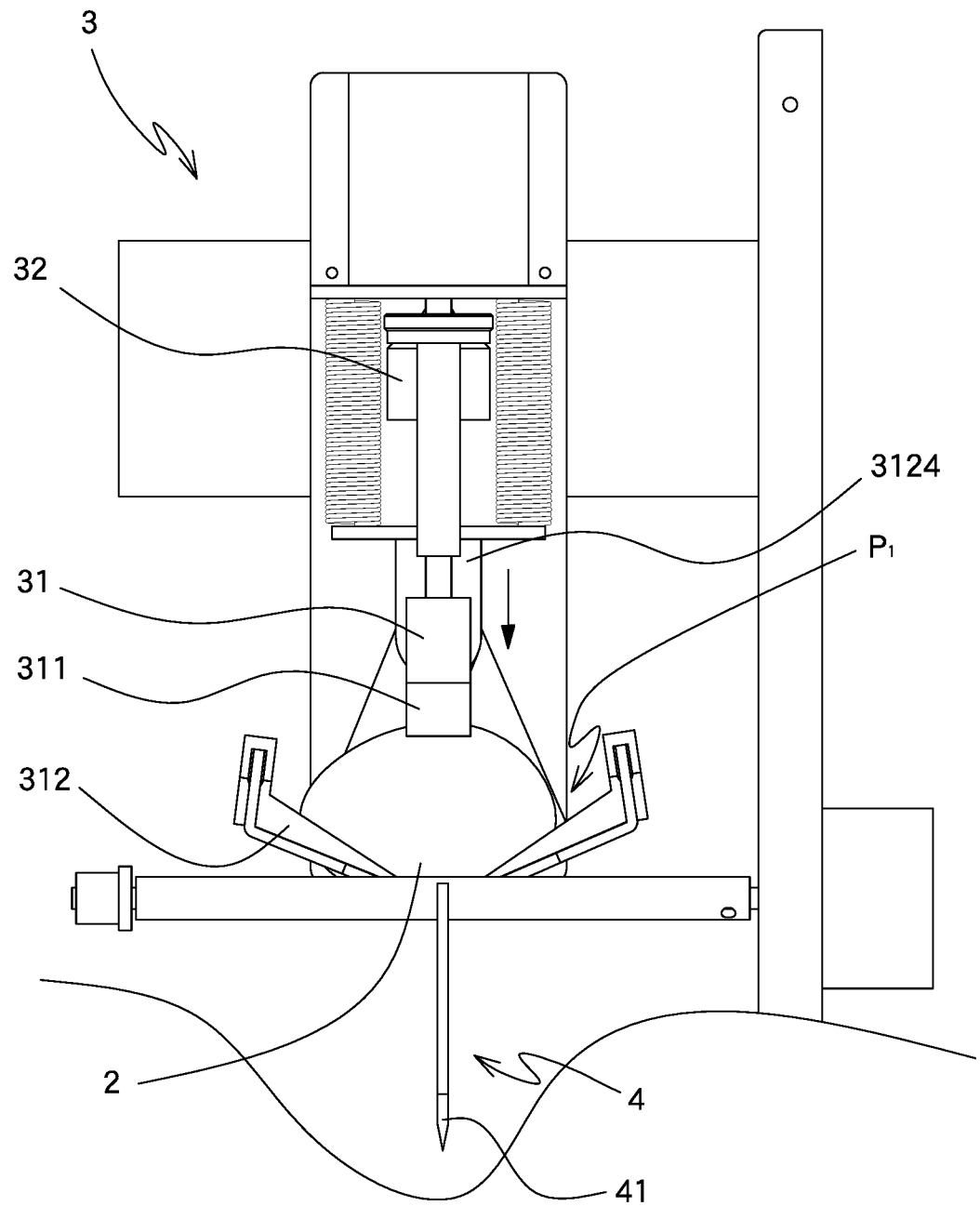
FIG. 7 shows that the pressing member presses the egg.

As shown in FIG. 7, the driving unit 71 drives the driving member 32 to move the pressing member 31 toward the eggs 2, wherein because the eggs 2 have different sizes and in order to let the contact member 311 successfully contact each of the eggs 2, the present invention uses the movable member 3124 to move downward along the drop rail 3121 to let the contact member 311 contact each of the eggs 2. Besides, by the gradually curved outward guide portion 3122, and by the operation unit 7 measuring the axial length of the egg 2, when the axial length of the egg 2 is longer than the pre-set value of the operation unit 7, the operation unit 7 commands the driving unit 71 to drive the contact member 311 reversely so that the contact member 311 contacts the egg 2 gently.

Figure 8:
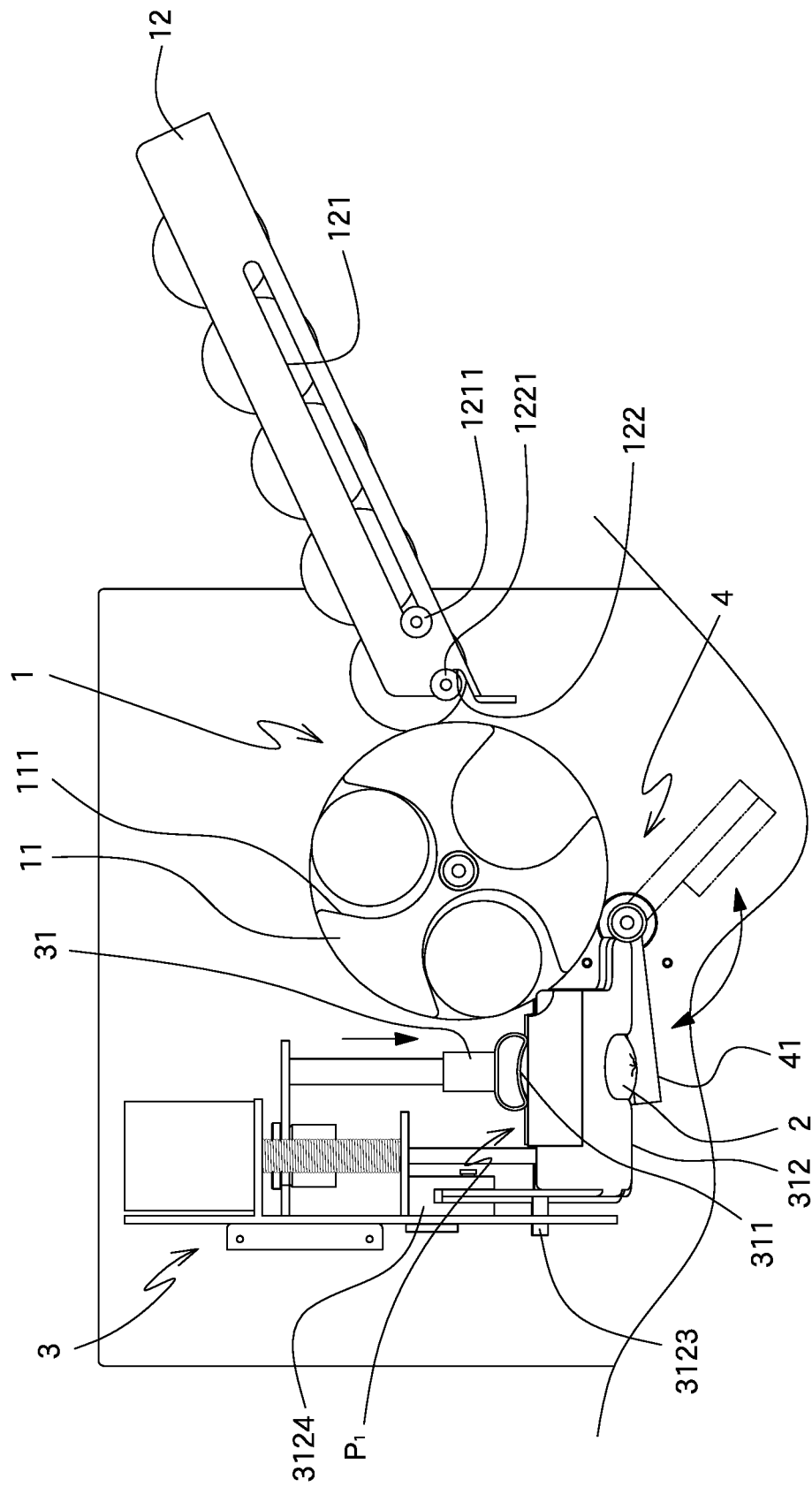
FIG. 8 shows that the cracking member cracks the egg.

As shown in FIG. 8, the control unit 72 drives the cracking device 4 to crack the egg 2 by the cracking member 41. The torque that the control unit 72 generates is about 12 kgf-cm, and the cracking member 41 cracks the egg and returns respectively spends only one second. Therefore, the cracking member 41 is avoided from being attached with too much of the egg liquid of the eggs 2.

Figure 9:
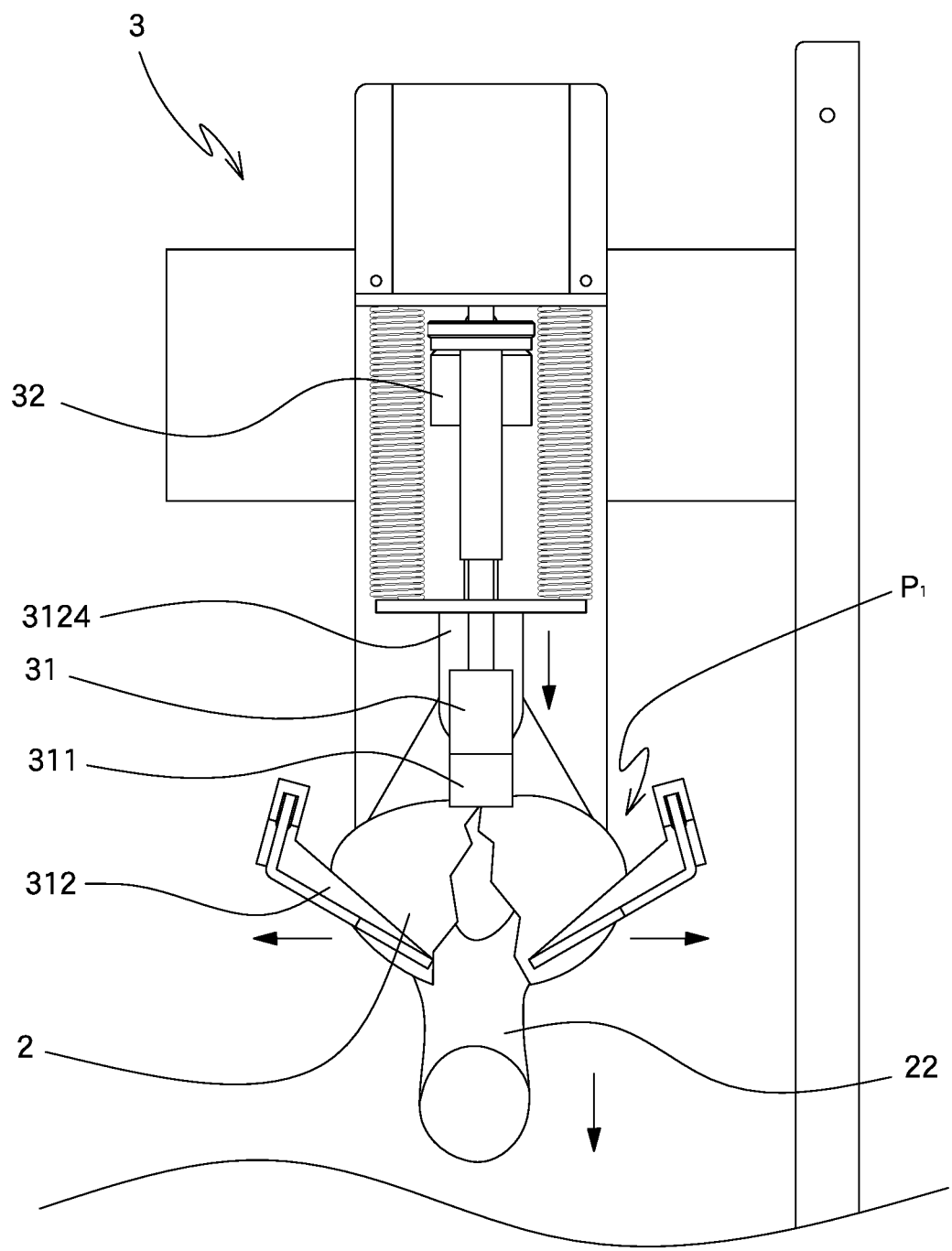
FIG. 9 shows that the egg shell is cracked into two halves.
Figure 10:
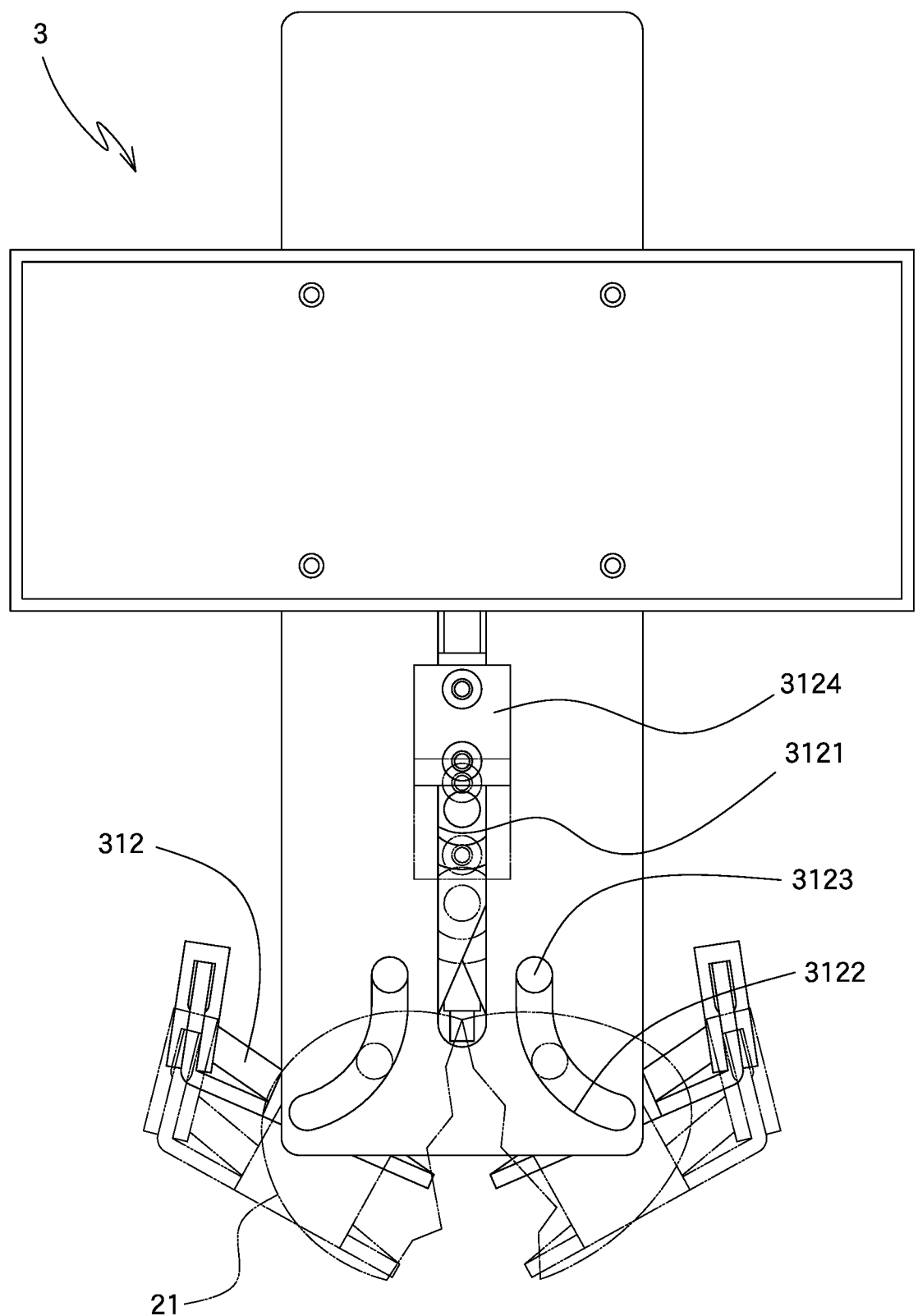
FIG. 10 is another view to show that the egg shell is cracked into two halves.
Figure 11:
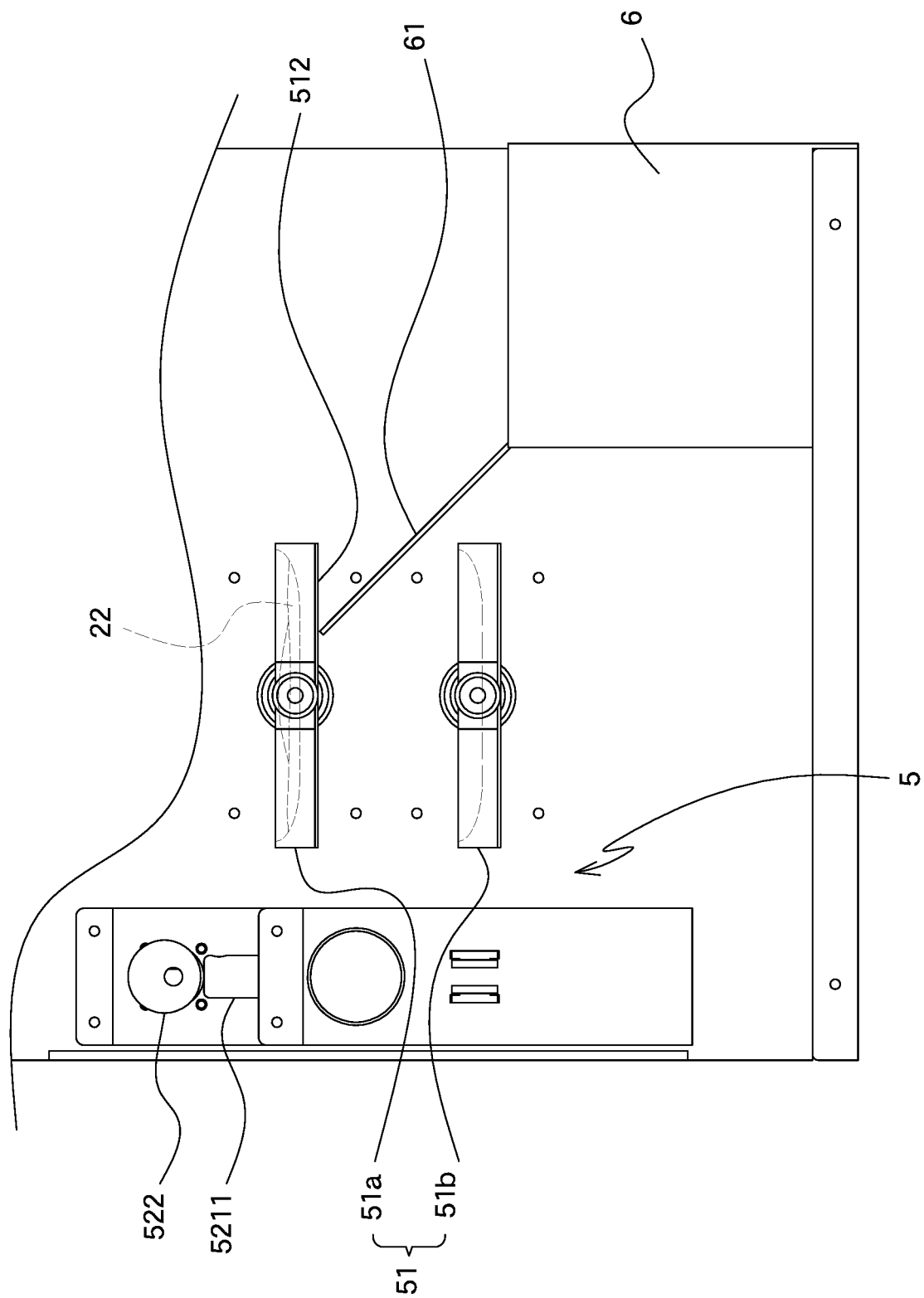
FIG. 11 shows the egg liquid is located in the first wok.

As shown in FIG. 9, the driving unit 71 drives the driving member 32 to command the pressing member 31 to press toward the direction that the egg 2 is located so that the claw 312 is gradually opened as shown in FIGS. 9 and 10 by the movement of the movable member 3124 along the drop rail 3121, and by the positioning member 3123 moving along the guide portion 3123. This action simulates a user's two hands separating an egg shell 21, such that the egg liquid 22 flows to the first wok 51a as shown in FIG. 11. After a pre-set time, for example 8 minutes (not limited to), the egg liquid 22 completely flows into the first wok 51a. The fuse 5111 is connected to the handle 513 to protect the wok 51a.

Figure 12:
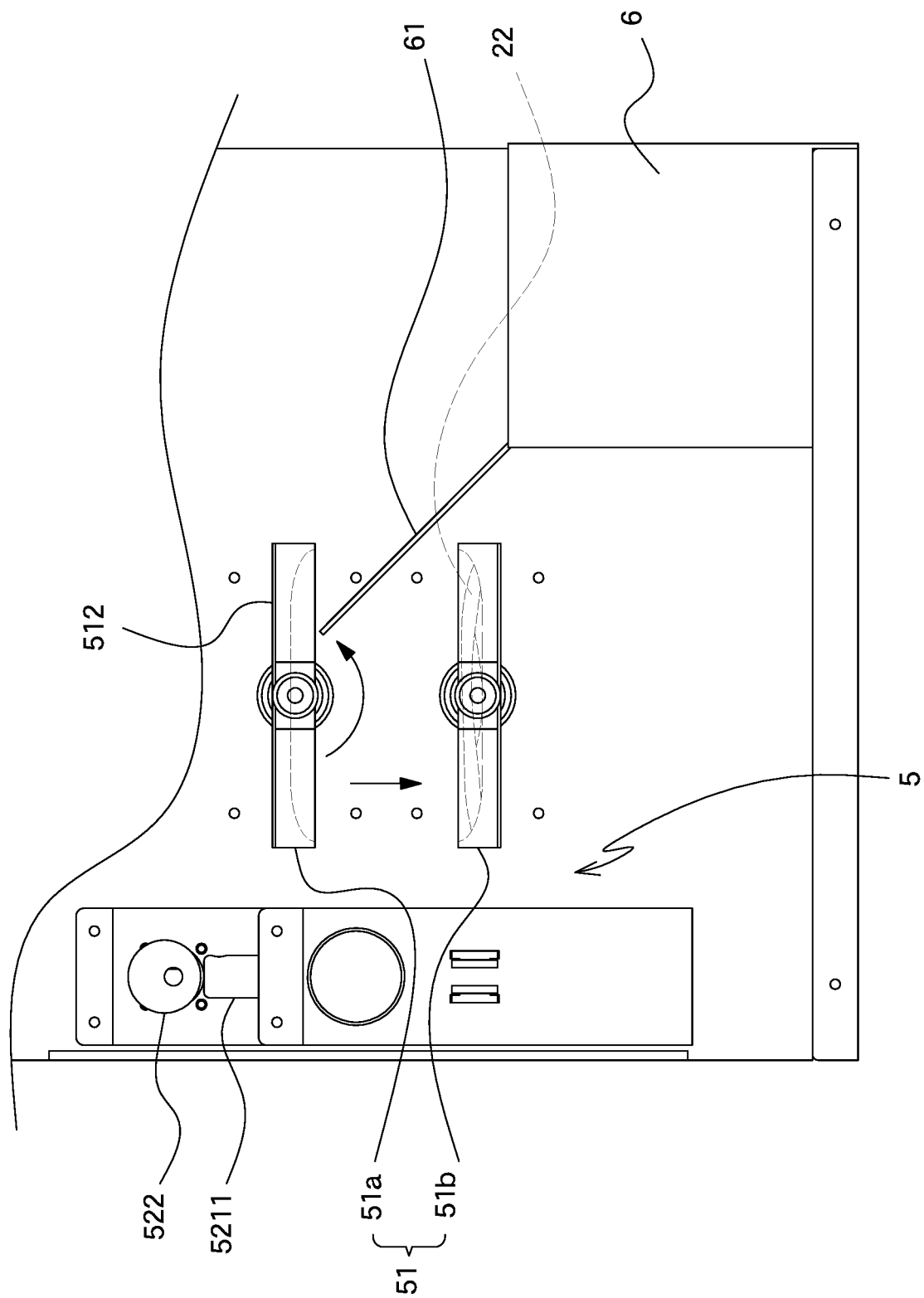
FIG. 12 shows the first wok is pivoted and the partially cooked egg drops into the second wok.

As shown in FIG. 12, when the bottom of the egg 2 is cooked and the top of the egg 2 is cooked medium rare, the control unit 72 pivots the first wok 51a, for example 180 degrees, to allow the egg liquid 22 to drop into the second wok 51b which then cooks the top of the egg 2. Because both of the first and second woks 51a, 51b include water-based Teflon so that the egg liquid 22 does not attach on the first wok 51a and the second wok 51b. After a pre-set time, the control unit 7 pivots the second wok 51b to drop the cooked egg 2 to a plate located beneath the second wok 51b to complete the cooking or the egg 2 that is cooked in the way of easy over.

Figure 13:
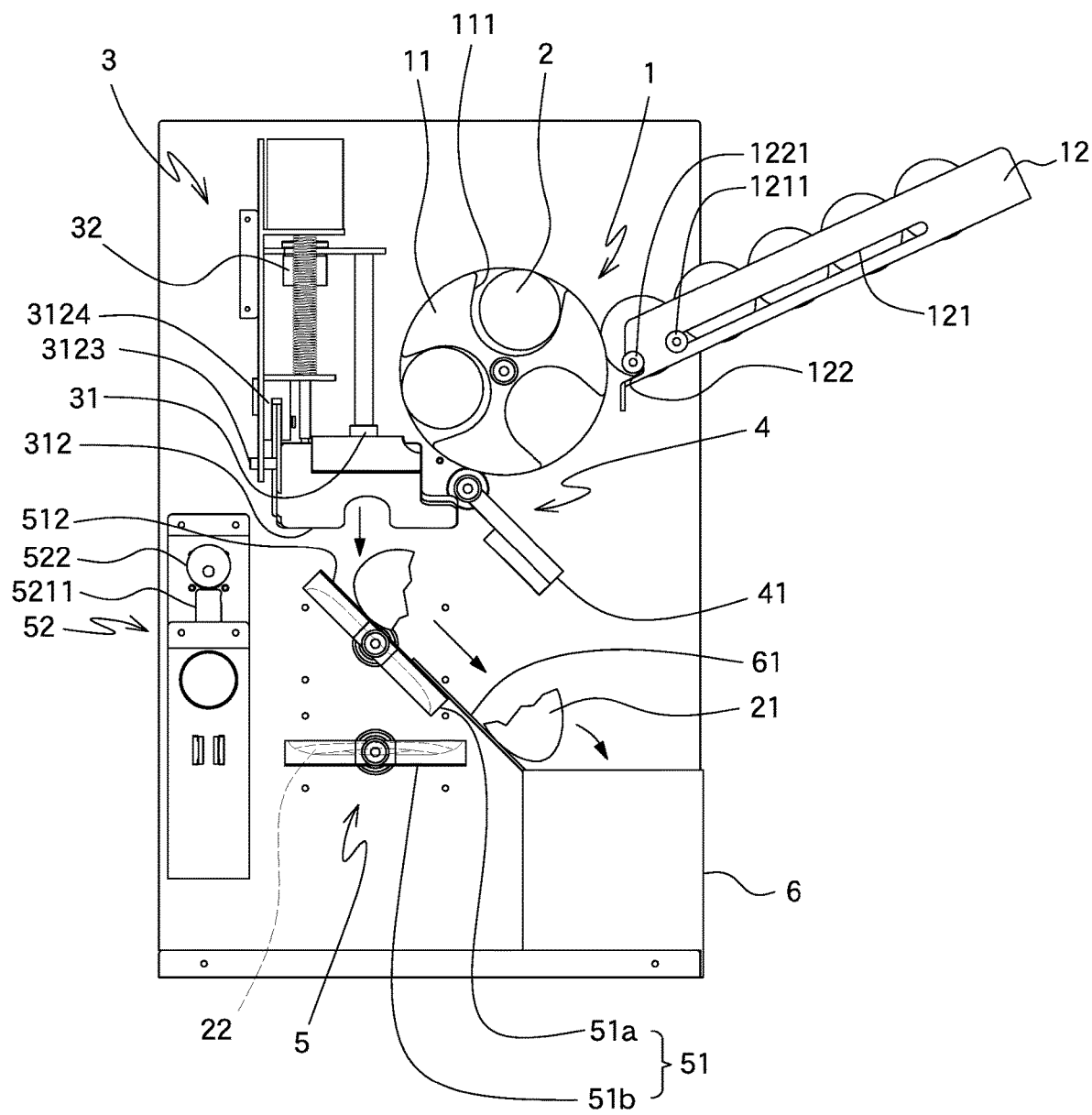
FIG. 13 shows that the egg shell drops into the garbage can.

As shown in FIG. 13, the control unit 72 then drives the first wok 51a to pivot a second pre-set angle such as 45 degrees, and the driving unit 71 drives the driving member 32 to continuously move the pressing member 31 to press the egg shell 21. The egg shell 21 is pushed downward by the pressing member 31 to push the claw 312, and the movable member 3124 moves downward along the drop rail 3121, and the positioning member 3123 moves along the guide portion 3122 to further open the claw 312 so that the egg shell 21 drops on the bottom 512 of the first wok 51a and then drops into the garbage can 6 via the board 61.

While we have shown and described the embodiment in accordance with the present invention, it should be clear to those skilled in the art that further embodiments may be made without departing from the scope of the present invention.

What is claimed is:

1. An egg cooking system comprising:
a feeding device having a support member and a feeding rail, the support member having at least one standby portion, the feeding rail having at least one egg put therein which is positioned at a pressing position by the at least one standby portion of the support member;
a pressing device having a pressing member which has a contact member, the contact member contacting the at least one egg, the pressing device pivotably connected to a claw, the pressing position located corresponding to the claw and the at least one egg located in the at least one standby portion being positioned at the pressing position, the claw having a drop rail and a guide portion, the drop rail having a movable member and the guide portion having a positioning member, wherein when the pressing member presses the claw, the movable member is movable along the drop rail, and the positioning member is movable along the guide portion to open the claw;
a cracking device located beside the claw and having a cracking member pivotably connected thereto, the cracking member cracking the at least one egg located at the pressing position;
a cooking device having at least one wok pivotably connected thereto, the least one wok having a heating member, an oil supply unit located corresponding to the at least one wok and providing oil into the at least one wok;
a garbage can located at one end of the cooking device, and
an operation unit having at least one pre-set angle and a pre-set time, the operation unit coupled to a driving unit, a control unit and a temperature control unit, the control unit coupled to the feeding device, the cracking device and the cooking device, the driving unit coupled to the pressing device, the temperature control unit coupled to the heating member.

2. The egg cooking system as claimed in claim 1, wherein the feeding rail has a path which includes an adjustment member which is movable along the path, the feeding rail includes a notch that is located corresponding to the support member, a positioning portion is engaged with the notch.

3. The egg cooking system as claimed in claim 1, wherein the oil supply unit includes an oil supply member and a squeezer which is located corresponding to the oil supply member, the squeezer is coupled to the control unit.

4. The egg cooking system as claimed in claim 1, wherein the garbage can includes a board which is located corresponding to the at least one wok, the garbage can includes an opening.

5. The egg cooking system as claimed in claim 1, wherein the operation unit is coupled to a display unit which displays a number of the at least one egg.

6. The egg cooking system as claimed in claim 1, wherein the drop rail is located vertically and a diameter of the guide portion is a curved slot which curves outward from a top to a bottom thereof.

7. The egg cooking system as claimed in claim 1, wherein the heating member is coupled to a fuse which is connected to a handle of the at least one wok.

8. The egg cooking system as claimed in claim 1, wherein the contact member is made of rubber.

9. The egg cooking system as claimed in claim 1, wherein a diameter of the at least one standby portion is larger than that of the at least one egg.

10. The egg cooking system as claimed in claim 1, wherein the contact member is located corresponding to the pressing position.

* * * * *